United States Patent [19]

Jiang

[11] Patent Number: 6,104,314
[45] Date of Patent: Aug. 15, 2000

[54] AUTOMATIC PARKING APPARATUS

[76] Inventor: Jung-Jye Jiang, P.O. Box 82-144, Taipei, Taiwan

[21] Appl. No.: 09/022,212

[22] Filed: Feb. 10, 1998

[51] Int. Cl.[7] ...................................................... B60Q 1/48
[52] U.S. Cl. ...................... 340/932.2; 340/436; 340/942; 414/253; 414/275; 414/279; 364/478.06; 705/13
[58] Field of Search ................................ 340/932.2, 942, 340/436, 437, 903, 938, 435, 673, 676, 686.1, 686.2, 825.15, 825.28; 414/227, 235, 240, 252, 253, 265, 275, 279; 705/13; 364/478.02, 478.06

[56] References Cited

U.S. PATENT DOCUMENTS

| | | | |
|---|---|---|---|
| 3,623,562 | 11/1971 | Pitra | 180/200 |
| 3,896,955 | 7/1975 | Collins et al. | 414/254 |
| 4,109,804 | 8/1978 | Moyano | 414/254 |
| 5,338,145 | 8/1994 | Beretta | 414/254 |
| 5,432,508 | 7/1995 | Jackson | 340/932.2 |
| 5,504,314 | 4/1996 | Farmont | 235/384 |
| 5,701,122 | 12/1997 | Canedy | 340/932.2 |
| 5,863,171 | 1/1999 | Engman | 414/256 |

*Primary Examiner*—Daryl Pope
*Attorney, Agent, or Firm*—A & J

[57] ABSTRACT

An automatic parking apparatus includes an automatic parking mechanism and a parking space identifying device. An upper plate of the automatic parking mechanism lifts up the chassis of a car. A control device on a baseplate of the mechanism keeps the mechanism moving along a straight line based on the input parking data and the data obtained by transceivers, a linear module, and the parking space identifying device. At the same time, available parking spaces may be detected so that cars may be placed correctly. The parking data are recorded, which makes it convenient to fetch the cars later on.

4 Claims, 7 Drawing Sheets

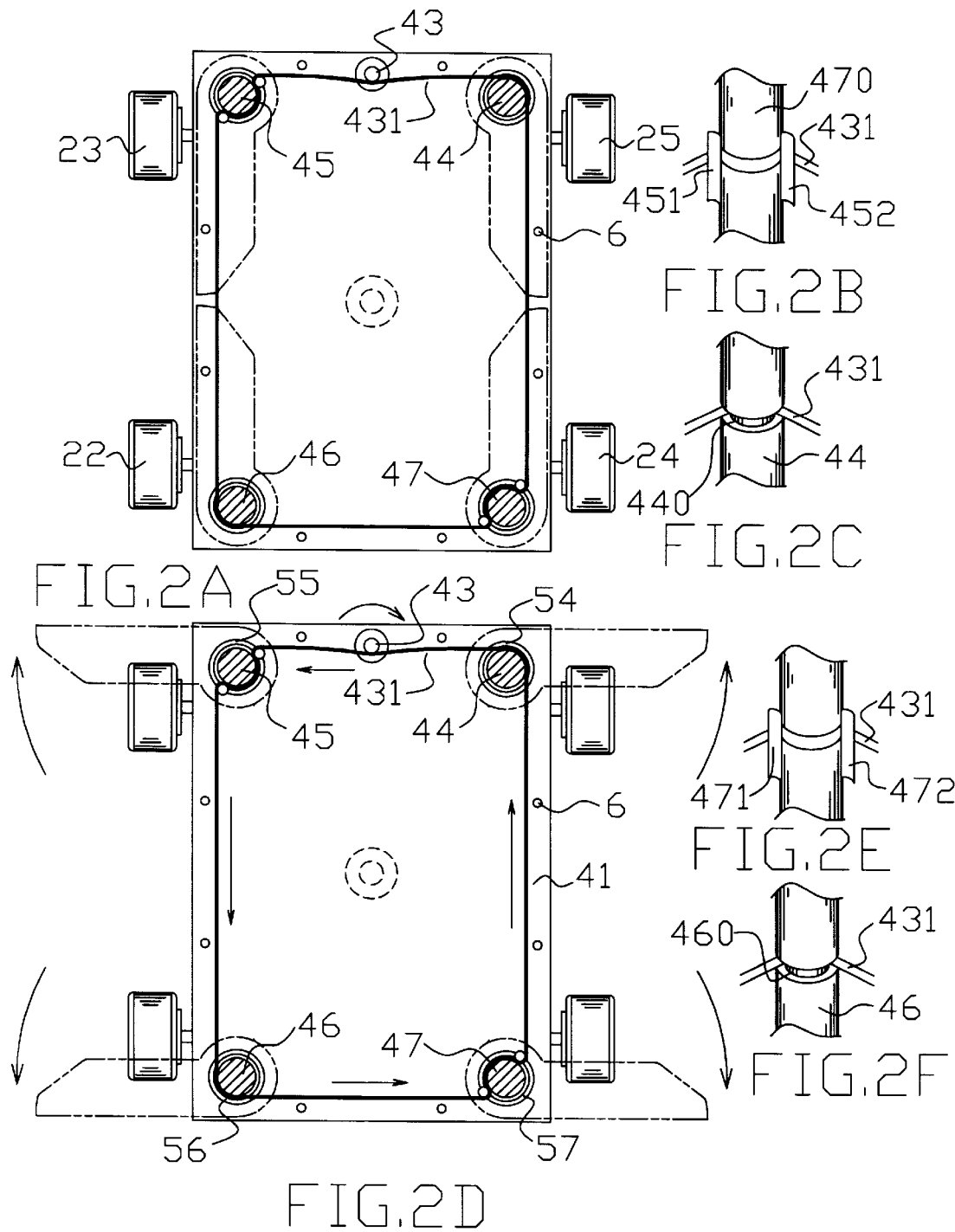

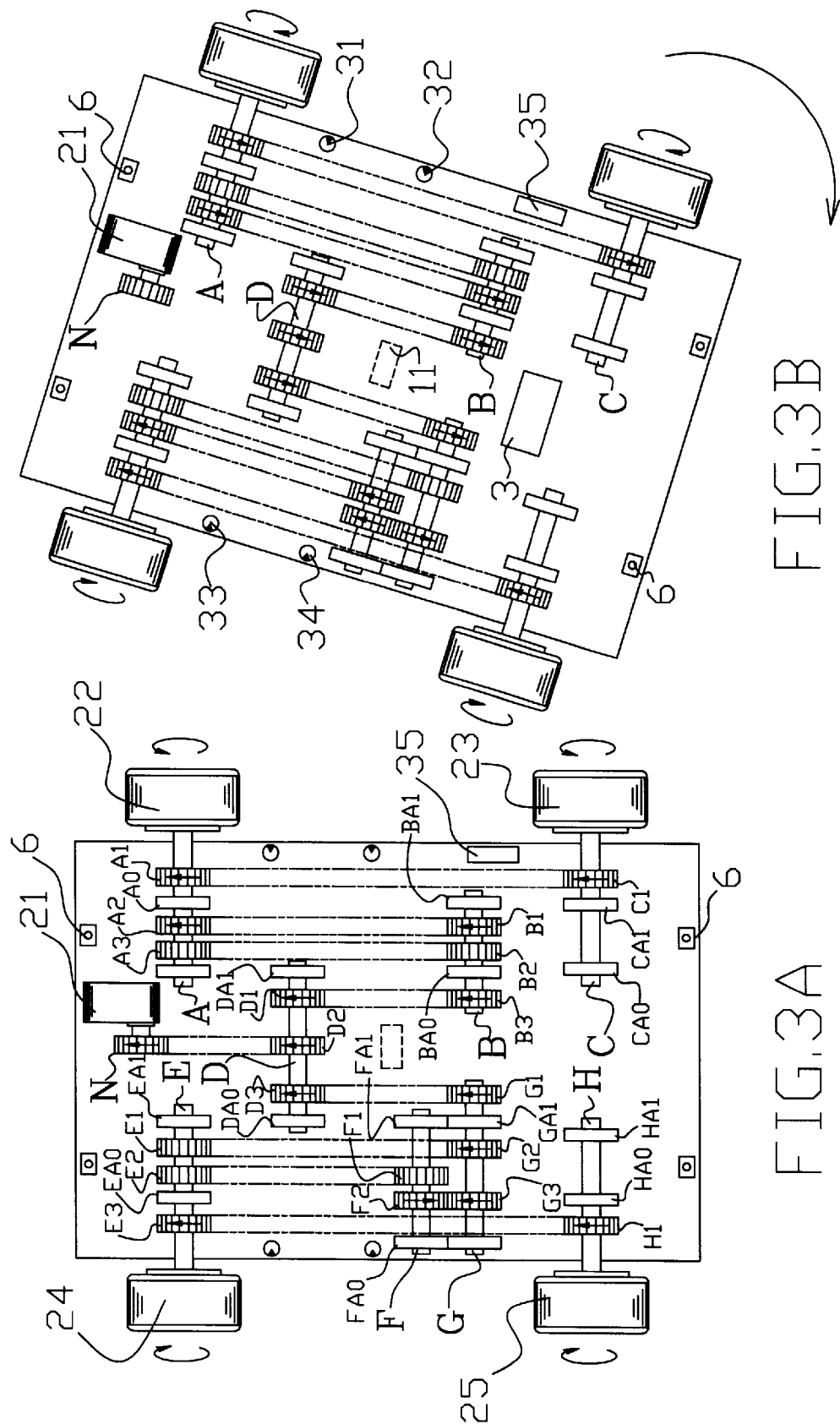

AUTOMATIC PARKING APPARATUS

BACKGROUND OF THE INVENTION

1. Field of the Invention

The present invention relates to an automatic parking apparatus.

2. Description of the Prior Art

Fully automated apparatuses are desirable as they reduce human labor to the minimum.

Conventional parking lots require the driver to drive into the parking lot and look for an available parking space. After parking the car, the driver has to walk out of the parking lot. If the car is parked at a farthest end of the parking lot and the parking lot is not properly planned, the driver may not remember where he/she has parked the car. Oftentimes, he/she has to walk all over the parking lot in order to find the car. Besides, parking lots are often dark and crimes may occur. The safety of people using parking lots is not ensured.

Therefore, it is an object of the present invention to provide an automatic parking apparatus which can obviate and mitigate the above-mentioned drawbacks.

SUMMARY OF THE INVENTION

The present invention relates to an automatic parking apparatus.

Accordingly, a primary object of the present invention is to provide an automatic parking apparatus which may reduce human labor at parking lots to the minimum so as to lower costs and enhance competitiveness.

Another object of the present invention is to provide an automatic parking apparatus which does not require the drivers to drive into the parking lot, thereby ensuring safety.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 2A, 2B, 2C, 2D, 2E and 2F are schematic views of the operation of the support pawls of the automatic parking mechanism of the present invention;

FIGS. 3A and 3B are schematic views showing the turning of the automatic parking mechanism of the present invention;

DETAILED DESCRIPTION OF THE PREFERRED EMBODIMENT

Figure 1A:
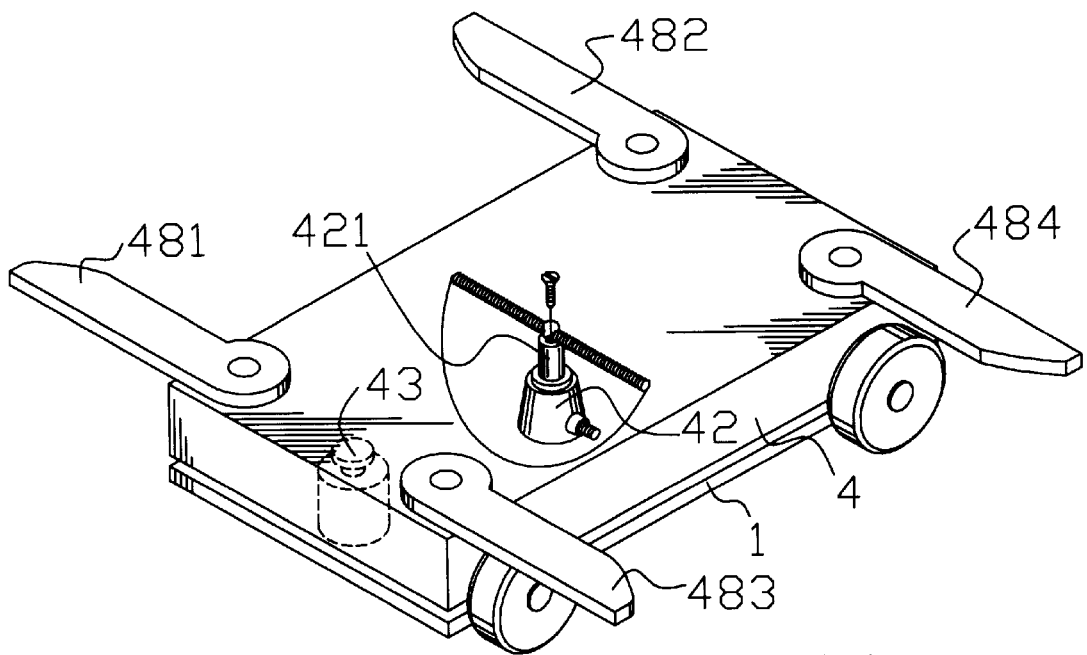
FIGS. 1A and 1B are perspective outer views of the automatic parking mechanism and elevator of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1B:
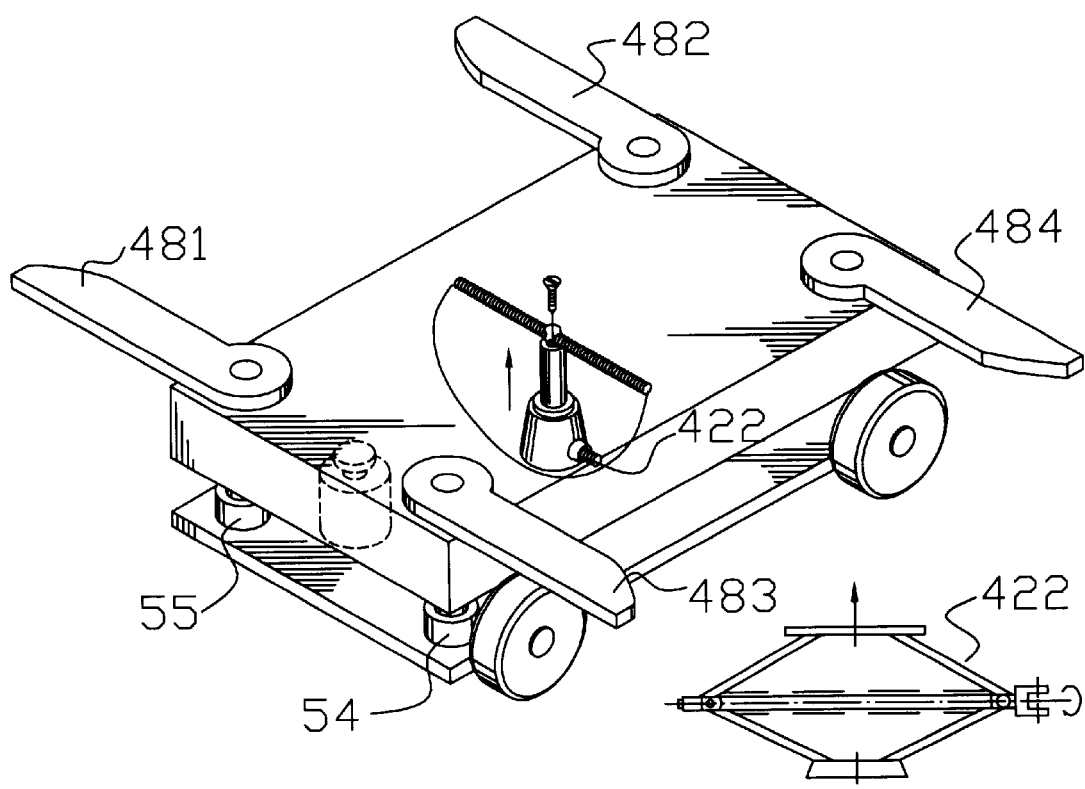
Figure 1C:
FIG. 1C shows a collapsible elevator of the present invention.

The present invention is directed to an automatic parking apparatus and is comprised of an automatic parking mechanism and a parking space identifying apparatus. The automatic parking mechanism (see FIGS. 1 and 3) comprises a baseplate 1, a transmission device 2, a control device 3, and an upper layer device 4. The baseplate 1 is a rectangular plate of a suitable material on which the transmission device 2, the control device 3, and a post-like elevator 42 are disposed.

The transmission device 2 (see FIG. 3) includes a dc motor 21 using two 12v battery jars, a sprocket N provided on the axle of the motor 21, a shaft D disposed behind the sprocket N at a suitable position, a sprocket D2 disposed centrally of the shaft D, sprockets D1 and D3 disposed at both sides of the sprocket D2 respectively, bearings DA0 and DA1 disposed at the outermost ends of the shaft D respectively, and a chain disposed between the sprockets N and D2. A shaft B is further disposed behind the shaft D to the right side at a suitable position. The shaft B has disposed thereon in sequence a bearing BA1, unidirectional sprockets B1 and B2, a bearing BA0, and a sprocket B3. A chain connects the sprocket D1 and sprocket B3. There is further provided a shaft A which has disposed thereon, respectively, a sprocket A1, a bearing AA0, positive unidirectional sprocket A2, a negative unidirectional sprocket A3, and a bearing AA1. A shaft C has disposed thereon respectively a sprocket C1, and bearings CA1 and CA0. A shaft E has disposed thereon respectively a bearing EA1, a negative unidirectional sprocket E1, a positive unidirectional sprocket E2, a bearing EA0, and a sprocket E3. A shaft F has disposed thereon a bearing FA1, a positive unidirectional sprocket F1, a spur gear F2, and a bearing FA0. A shaft G has disposed thereon a sprocket G1, a bearing GA1, a negative unidirectional sprocket G2, a spur gear G3, and a bearing GA0. A shaft H has disposed thereon bearings HA1 and HA0, and a sprocket H1. Four wheels are mounted respectively on shafts A, C, E and H. Chains are respectively provided between sprockets A3 and B2, A2 and B1, A1 and C1, D3 and G1, E1 and G2, E2 and F1, and E3 and H1 for transmission purposes.

When the motor 21 of the transmission device 2 rotates in a positive direction (as shown in FIG. 3A), the sprocket N will drive the sprocket D2 to rotate in a positive direction via chain, so that the sprockets D1 and D3 on the same shaft D will synchronously rotate in a positive direction and respectively bring sprockets D1 and B3 to rotate in a positive direction via chains. And since the negative unidirectional sprocket B2 does not drive the chains when rotating reversely, the sprocket B3 can only drive the positive unidirectional sprocket B1 to rotate in a positive direction and continue to bring the sprockets A2, A1 and C2 to rotate in a positive direction. Therefore, the front wheel 22 and rear wheel 23 rotate in a positive direction. The transmission path is N positive—D2 positive—D1 positive—B3 positive—B1 positive—A2 positive—A1 positive—C1 positive. The sprocket D3 drives sprockets G1, G2 and spur gear G3 to rotate in a positive direction, and the transmission path is that sprockets G2, E1, E3 and H1 rotate in a positive direction while spur gear G3 drives the spur gear F2 to rotate reversely. And since the sprocket F1 is a reverse unidirectional gear, the transmission of power ends here. Therefore, the front wheel 24 and rear wheel 25 rotate in a positive direction, and the transmission path is N positive—D2 positive—D3 positive—G1 positive—G2 positive—E1 positive—E3 positive. The automatic parking mechanism therefore advances forwardly. When the motor 21 of the transmission device 2 rotates reversely (see FIG. 3B, sprocket N drives sprocket D2 via chain to rotate reversely, so that sprockets D1 and D3 on shaft D synchronously rotate reversely and respectively drive sprockets D1-B3 via chain to rotate reversely. And since the positive unidirectional sprocket B1 does not drive the chain when rotating reversely, the sprocket B3 can only drive the negative unidirectional sprocket B2 to rotate reversely and continue to drive sprockets A3, A1 and C1 to rotate reversely, so that the front wheel 22 and rear wheel 23 rotate reversely. The transmission path is N reverse—D2 reverse—D1 reverse—B3 reverse—B2 reverse—A3 reverse—A1 reverse—C1 reverse. The sprocket D3 drives sprockets G1, G2 and spur gear G3 to rotate reversely, and the transmission path is that the spur gear G3 rotates reversely and drives the spur gear F2 to rotate in a positive direction, drives the positive unidirectional sprocket F1 to rotate in a positive direction, and further drives the positive unidirectional sprocket E2 to rotate in a positive direction, i.e., sprockets E3 and H1 rotate in a positive direction. The transmission path is N reverse—D2 reverse—D3 reverse—G1 reverse—G3 reverse—F2 positive—F1 positive—E2 positive—E3 positive—H1 positive. Additionally, since the negative unidirectional sprocket G2 does not transmit power when rotating reversely, it cannot drive downwardly. From the above-described structure, it can be seen that since the ratio of the number of teeth of sprockets is 1:1, a car's advancing length (positive rotation) or degree of rotation (reverse rotation) may be precisely controlled by the degree of rotation of the axle of the motor 21. In other words, when the motor 21 rotates in a positive direction, the automatic parking mechanism of the present invention advances, and when the motor 21 rotates reversely, the present invention rotates in a single direction on the spot.

A road mark reflecting reception device 11 is further provided at a lower side of the baseplate 1 in the middle thereof. At both sides of the baseplate 1 are mounted empty parking space judging, transceiving devices 31, 33 and parking address judging, transceiving devices 32, 34. A linear module 35 is provided at one side. The linear module 35 is comprised of a reset device 351 accommodating therein a transmitter 3511 and a receiver 3512, a transmitting device 352, a front end receiver 3521, and a rear end receiver 3522. The control device 3 is installed at a suitable position of the baseplate 1 and includes a single chip 8051 and dual 8255 IC for controlling all I/O related devices, and software is used to control the programs.

The elevator 42 is provided at the face of the baseplate 1 in the middle. The elevator 42 has a top portion 421 urging against an upper layer plate 41, which has four corners respectively provided with support shafts 44, 45, 46, and 47 (see FIGS. 2A, 2B, 2C, 2D, 2E and 2F). The support shafts are respectively provided with slotted neck portions 440, 450, 460, and 470 for receiving a cable 431. The cable 431 is wound over the neck portion 440 of support shaft 44 and auxiliary posts 471, 472 of the support shaft 47 into the neck portion 472. The cable 431 is then wound over support shafts 46 and 45 in the same fashion to form an enclosed region. A support pawl control wheel 43 urges against the cable 431. The support shafts 44, 45, 46, and 47 are respectively provided with support pawls 481, 482, 483, and 484 so that they may rotate in a positive direction to cause the support pawls to extend so as to support the chassis of the car or in a reverse direction to cause the support pawls to close. The above-described elevator 42 may be a collapsible elevator (see FIG. 1C).

Furthermore, three kinds of reflecting plates are erected at the rear side of each parking space, namely, an empty parking space detecting reflecting plate 31R, a parking address detecting reflecting plate 32R, and a linear module reflecting plate 35R.

Figure 4:
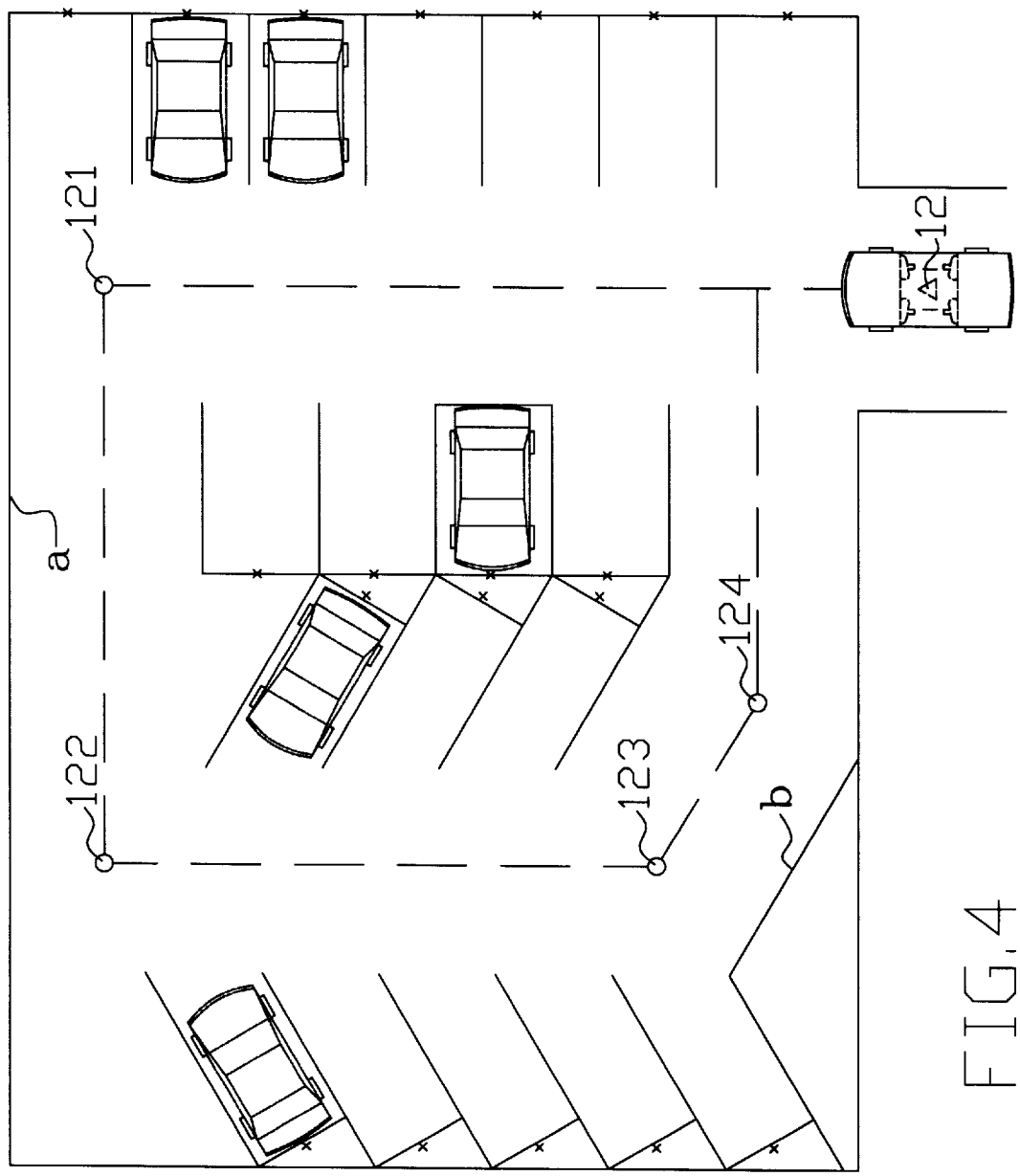
FIG. 4 is a plan schematic view of the present invention.
Figure 5A:
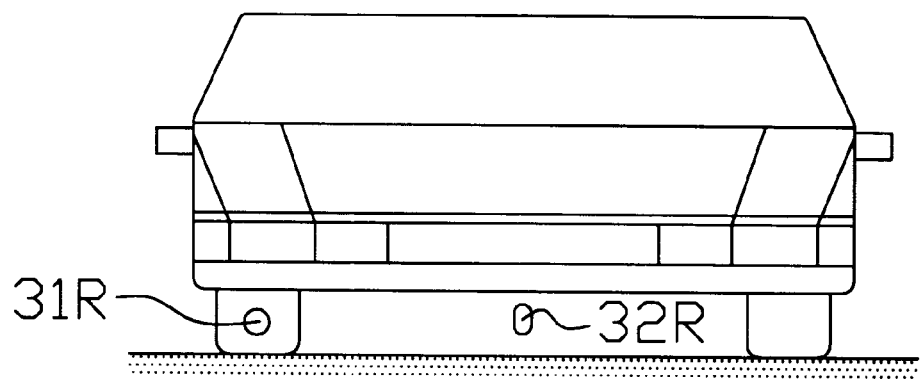
FIGS. 5A and 5B are schematic views of the reflecting devices of the present invention.
Figure 5B:
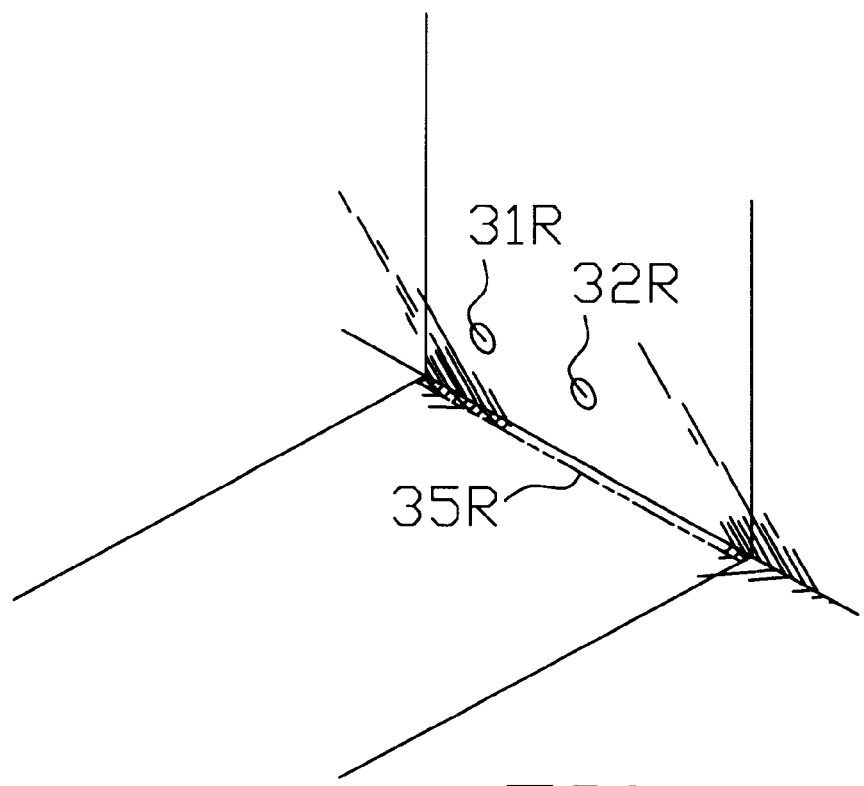
Figure 6A:
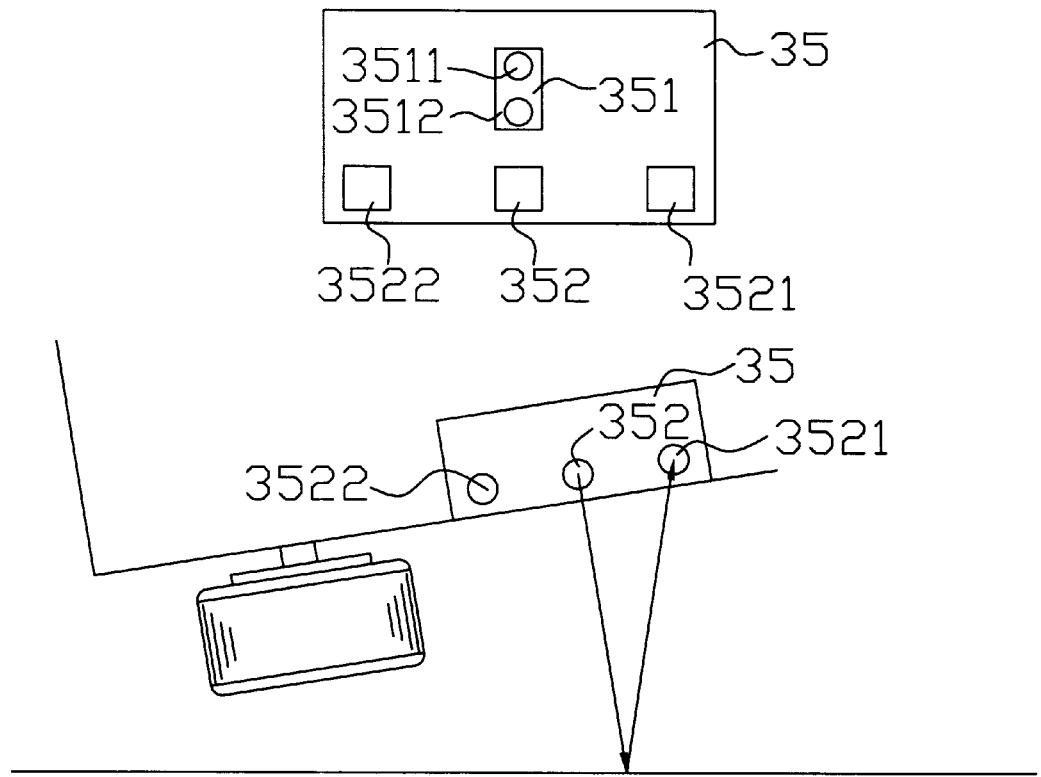
FIGS. 6A and 6B are schematic views of the operation of the linear module of the present invention.
Figure 6B:
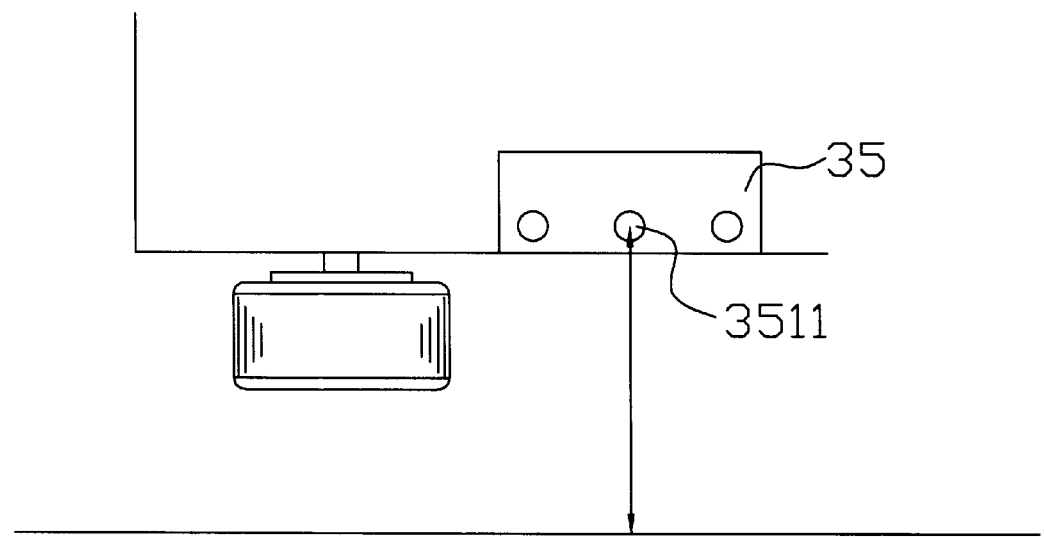
Figure 7:
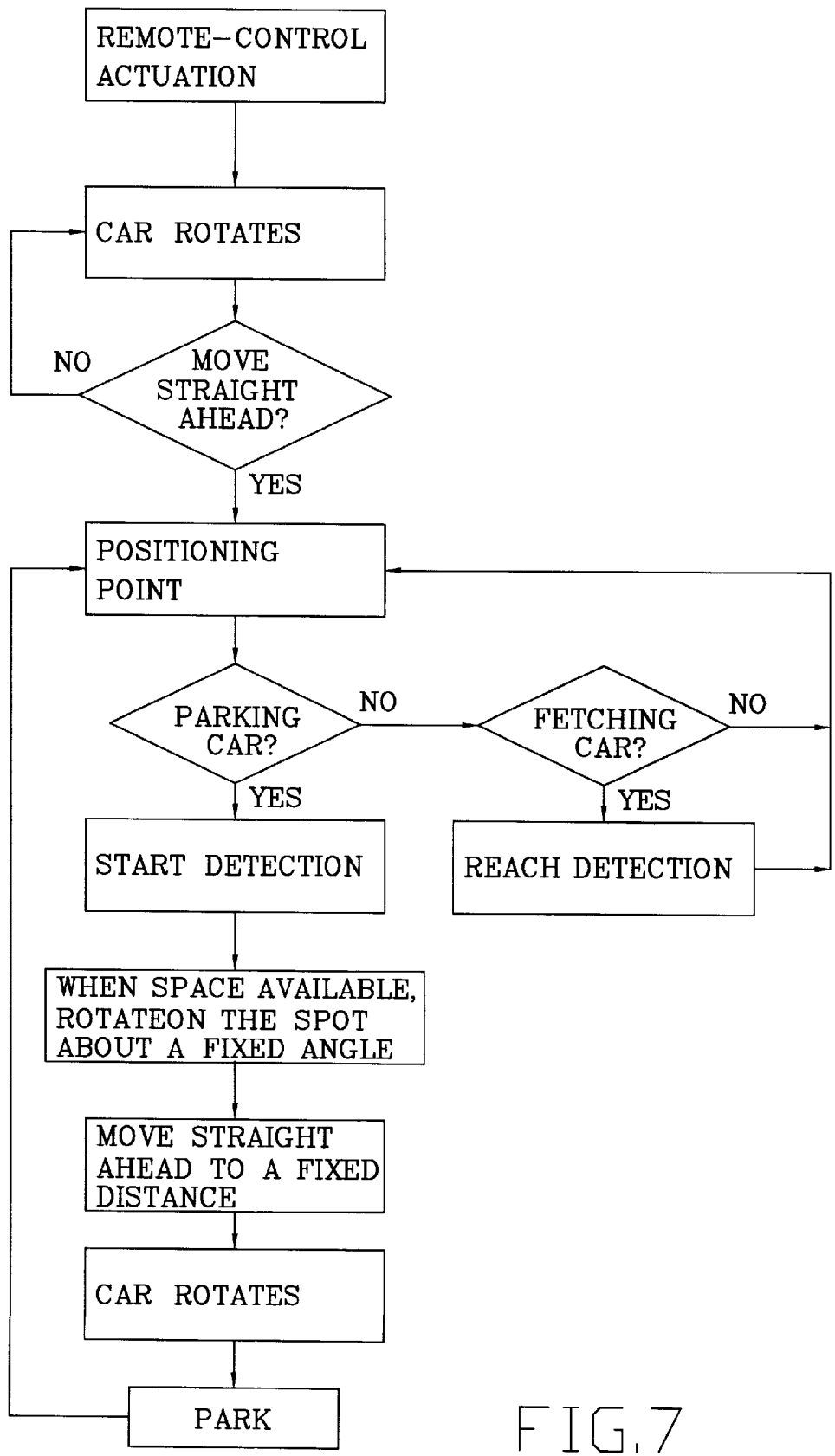
FIG. 7 is a flow-chart of the automatic parking mechanism of the present invention.

FIG. 7 shows the control flowchart of the operation of the automatic parking mechanism of the present invention. According to the technique employed in the present invention, data of the parking lot (see FIG. 4) are input into the control device 3 in advance, a red positioning point 12 is embedded in the ground at a positioning point of the parking lot, and yellow marking points 121, 122, 123, and 124 are embedded in the ground at each bend. When the automatic parking mechanism is remote-controlled by hand to creep among the four wheels of a car, the support pawls 481, 482, 483, and 484 are extended. The elevator 42 actuates the upper layer device and lifts the car up. The mechanism then moves to the positioning point 12. After the road mark reflecting receiving device of the automatic parking mechanism has detected alignment, the motor 21 rotates in a positive direction, and the automatic parking mechanism (hereinafter referred to as cart) carrying the car advances. At the same time, the empty parking space judging transceiving devices 31 and 33, parking address judging transceiving devices 32 and 34, and the linear module 35 will start operation. Referring to FIGS. 5 and 6, when the cart advances, it is maintained to move along a straight line by utilizing the transmitting device 352 inside the linear module 35 which emits an infrared ray, which is received and judged by the front end receiver 3521 and the rear end receiver 3522. Supposing the front of the cart deviates to the left, when the infrared ray emitted by the transmitter 352 is reflected to a certain amount of deflection, the front end receiver 3521 will receive the ray, so that the control unit starts a correction mode, which is operated by the reset device 35. As shown in FIG. 6B, when the program judges the signal received by the front end receiver 3521, it will turn the cart to the right in correction. At the same time, the transmitter 3511 inside the reset module 35 emits an infrared ray, which is likewise reflected by the reflecting plate 35R until the receiver 3512 receives the signal, indicating that the cart has properly aligned with the parking space. The correction mode will then stopped. Additionally, the transmitting device 352 transmits a fresh an infrared ray to detect whether the cart has deviated from the parking space. If the front of the cart deviates to the right, the principle of the correction operation is the same. But the infrared ray emitted by the transmitting device 352 is reflected by the reflecting plate 35R and is received by the rear end receiver 3522 when the reflected ray has reached a certain amount of deflection.

In addition, four obstacle detectors 6 are provided at the outer sides of the cart's front and rear sides. When an object enters a certain range of the cart, the program will determine and stop all operations of the cart, preventing the car carried by the cart from being hit. Once the obstacles are cleared, the cart will start operation again.

When the cart advances, the empty parking space judging transceiving devices 31, 33 and parking address judging transceiving devices 32, 34 will be started simultaneously, and they will judge from the left or right side first. The parking address judging transceiving devices 32, 34 utilize the reflecting plate 32R to reflect signals, so that the program may obtain the parking address and register. And when there is no car parking at the parking address, the empty parking space judging transceiving devices 31, 33 receive signals reflected by the reflecting plate 31R, so that the program may determine that parking space is available for parking. Then the cart will be rotated about a suitable angle and the car carried thereby is loaded into the available parking space. Besides, all relevant parking data are registered so that the cart may conveniently find and get the car later on. If there is already a car parking there, then the wheels of the car there will block the reflecting plate 31R so that the empty parking space judging transceiving device 33 or 33 cannot receive any signals. The program may hence judge that that parking space is not available for parking and control the cart to move forward. But since the reflecting plate 32R is not blocked, the parking address judging transceiving devices 32, 34 will add one more address record. When the cart has found an available parking space, that parking address will be recorded.

Based on the same principle, the cart continues to move forward. When there is any corner or bend, the road mark reflecting receiving device 11 on the cart will detect the yellow marking points 121 (see FIG. 4). The database of the program will judge that the cart should turn 90 degrees left on meeting the first yellow marking point 121 and calculate the number of rotations of the axle of the motor 21 of the cart for reverse output, so that the cart turns about 270 degrees to the right (the cart advances during positive rotation and rotates on the spot during reverse rotation) and continue to advance in a linear direction. A reflecting plate 35R is erected at a vertical face a at one side of a lane between yellow marking points 121–122. But reflecting plates 31R and 32R are not mounted, so that the cart can go along a straight line. When the cart has moved to the yellow marking point 122, the program may control the cart to turn in the same fashion. But since the parking space between the yellow marking points 122 and 123 is not perpendicular to the lane, when the cart drives into the lane, the empty parking space judging transceiving devices 31, 33 and parking address judging transceiving devices 32, 34 have to be controlled by a step motor to rotate about an angle parallel to the parking space so that transmission, reception and reflection may be accurate. Besides, a reflecting plate 35R is erected at a vertical face b at one side of the lane between yellow marking points 123 and 124 to ensure that the cart may move forward in a straight line.

Certainly, by employing the same correction principle of the linear module 35, the reflecting plate 35R may also be installed on the ceiling or floor of the lane along which the cart moves, and the linear module 35 may be provided in a corresponding position.

When the cart has finished putting the car in position, it will return to the red positioning point 12 to get ready for the next operation. To fetch the car, the cart will go directly to the parking address as recorded and lift the car in the same manner as described hereinabove. If there is no more available parking space in the parking lot, the program will know in advance from the recorded parking data obtained by the parking address judging transceiving devices 32, 34, and the cart will not carry any cars into the parking lot any more.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An automatic parking apparatus comprising an automatic parking mechanism and a parking space identifying apparatus, said automatic parking mechanism comprising a baseplate, a transmission device, a control device, and an upper layer device, said baseplate being a rectangular plate having provided thereon said transmission device, said control device, and an elevator;

said transmission device including a direct current motor, said motor having a sprocket provided on an axle thereof, four wheel axles being disposed behind said motor, four shafts being disposed near the sides of said wheel axles, said shafts being provided with sprockets and bearings thereon, with chains arranged between said sprockets, four wheels being mounted on said shafts, the first of said shafts being connected to said motor being provided with left and right portions for transmission, said right portion utilizing a pair of positive and negative unidirectional gears to drive said motor to rotate in a positive direction so that the wheels at the right side rotate in a positive direction and to drive said motor to rotate reversely so that the wheels at the right side rotate in a reverse direction, said left portion utilizing a pair of positive and negative unidirectional gears and a pair of spur gears to cause said motor to rotate in a positive or reverse direction so that the wheels at the left side always rotate in a positive direction;

said baseplate being provided with a road mark reflecting receiving device in the middle of a lower side thereof, empty parking space judging transceiving devices, and a linear module being installed at one side thereof, said linear module including a reset device accommodating therein a transmitter and a receiver, a transmitting device, a front end receiver, and a rear end receiver, said control device being disposed on said baseplate and accommodating therein a software language controlled program to control input/output devices of said control device;

said elevator being disposed at the middle of the face of said baseplate for urging an upper plate of said upper layer device, said upper plate having four corners each provided with a support shaft fitted with a support pawl, so the support pawl's control wheels may turn in a positive direction to extend said support pawl or turn reversely to close said support pawl;

an empty space detecting reflecting plate, a parking address detecting reflecting plate, and a linear module reflecting plate being erected at a vertical face of the rear side of each parking space;

wherein data of a parking lot are pre-input into said control device and red positioning points are embedded in the ground of the parking lot as original points, and yellow marking points are embedded in the ground at each turn;

wherein said automatic parking mechanism is remote-controlled by hand to maneuver among the four wheels of a car so as to be positioned underneath the car, and after being positioned underneath said car, said support pawl is extended and said elevator actuates said upper layer device and lifts the car up, after the car is in a lifted position, said mechanism then moves to one of said positioning points, after said road mark reflecting receiving device of said automatic parking mechanism has detected alignment with said parking space, said motor rotates in a positive direction and the automatic parking mechanism carrying the car advances, at the same time the advancement of the car begins, said empty parking space judging transmitting and receiving devices, said parking address judging transmitting and receiving devices, and said linear module start operation, while advancing, said automatic parking mechanism is maintained to move along a straight line by utilizing said transmitting device inside said linear module which emits an infrared ray which is received and judged by said front end receiver and said rear end receiver, during said advancement of said automatic parking mechanism, obstacle detectors are actuated simultaneously so that when obstacles enter within a certain proximity range of said automatic parking mechanism, said automatic parking mechanism will temporarily stop movement until the obstacles are cleared from the proximity range of said mechanism, and during said advancement of said automatic parking mechanism, said empty parking space judging transceiving devices and said parking address judging transceiving devices are also simultaneously actuated so as to judge the availability of a parking space from the left or right side first, and said parking address judging transceiving devices utilize reflected signals from said reflecting plates so that said program obtains a parking address and register; and when there is no car parked at the parking address, said empty parking space judging transceiving devices receive signals via the reflection of said reflecting plates so that the program determines that said parking space is available for parking, then said automatic parking mechanism is rotated about an angle before the carried car is placed into the available parking space, and after placement of the car into the space, parking data pertaining to that particular car and the space that the car was placed are registered so that said automatic parking mechanism may conveniently find and fetch the car when necessary; and when there is already a car parked in the parking address, then the wheels of that parked car are positioned so as to block said reflecting plate so that said empty parking space judging transceiving device cannot receive reflected signals from said reflecting plates, thereby causing the program to judge that that particular parking space is not available for parking a car, and thereby controls said automatic parking mechanism to move forward, and when said reflecting plates are not blocked, said parking address judging transceiving device adds the address of the unblocked reflecting plates to an address record so that the parking address of an available parking space will be recorded; and when there is any corner or bend in the ground, said road mark reflecting receiving device on said automatic parking mechanism detects said yellow marking points in the ground at the corner or bend and then turns; and when the available parking space is not perpendicular to a lane, said empty parking space judging transceiving devices and said parking address judging transceiving devices are controlled by a step motor to rotate about an angle parallel to the available parking space so that transmission, reflection, and reception of signals for the transceiving devices are accurate; and when said automatic parking mechanism has finished parking the car, it will return to said red positioning points to prepare for another parking operation.

2. The automatic parking apparatus as claimed in claim 1, wherein said sprockets and said chains are pulleys and belts.

3. The automatic parking apparatus as claimed in claim 1, wherein said elevator for elevating said upper layer device is a collapsible elevator.

4. The automatic parking apparatus as claimed in claim 1, wherein said reflecting plate of said linear module is mounted on the ceiling right above the lane of the parking lot or on the ground, and said linear module extends out of said automatic parking mechanism or out of the lower side of said automatic parking mechanism to receive signals reflected by said reflecting plate for correction purposes.

* * * * *